United States Patent [19]
Maitre

[11] 3,954,043
[45] May 4, 1976

[54] METHOD AND APPARATUS FOR CLAMPING AND MILLING WORK IN A LATHE

[76] Inventor: Paul Maitre, 74100 Annemasse (Haute-Savoie), France

[22] Filed: May 13, 1975

[21] Appl. No.: 577,132

[30] Foreign Application Priority Data
May 14, 1974 France.............................. 74.17387

[52] U.S. Cl.............................. 90/11 C; 90/DIG. 1; 29/37 R; 29/57
[51] Int. Cl.² ...................... B23C 7/02; B23B 25/00
[58] Field of Search.......... 29/37 R, 38 R, 57, 27 C, 29/28; 90/11 C, DIG. 1

[56] References Cited
UNITED STATES PATENTS

| | | |
|---|---|---|
| 1,449,172 | 3/1923 | Gendreau et al. ...................... 29/57 |
| 1,963,033 | 6/1934 | Rupple................................... 29/57 |
| 2,325,012 | 7/1943 | Miller ...................................... 29/57 |
| 2,326,423 | 8/1943 | Adams................................. 29/37 R |
| 2,791,822 | 5/1957 | Worrell............................... 29/37 R |

*Primary Examiner*—Leonidas Vlachos
*Attorney, Agent, or Firm*—Dowell & Dowell

[57] ABSTRACT

A method and apparatus for use on an automatic multispindle lathe of the type wherein the spindles are indexed into various positions about a central axis, the present method and apparatus including stopping rotation of the spindle and work piece in one of said positions, clamping the work piece, milling the work piece, releasing the clamping thereof, and indexing the lathe to bring another work piece into position.

5 Claims, 6 Drawing Figures

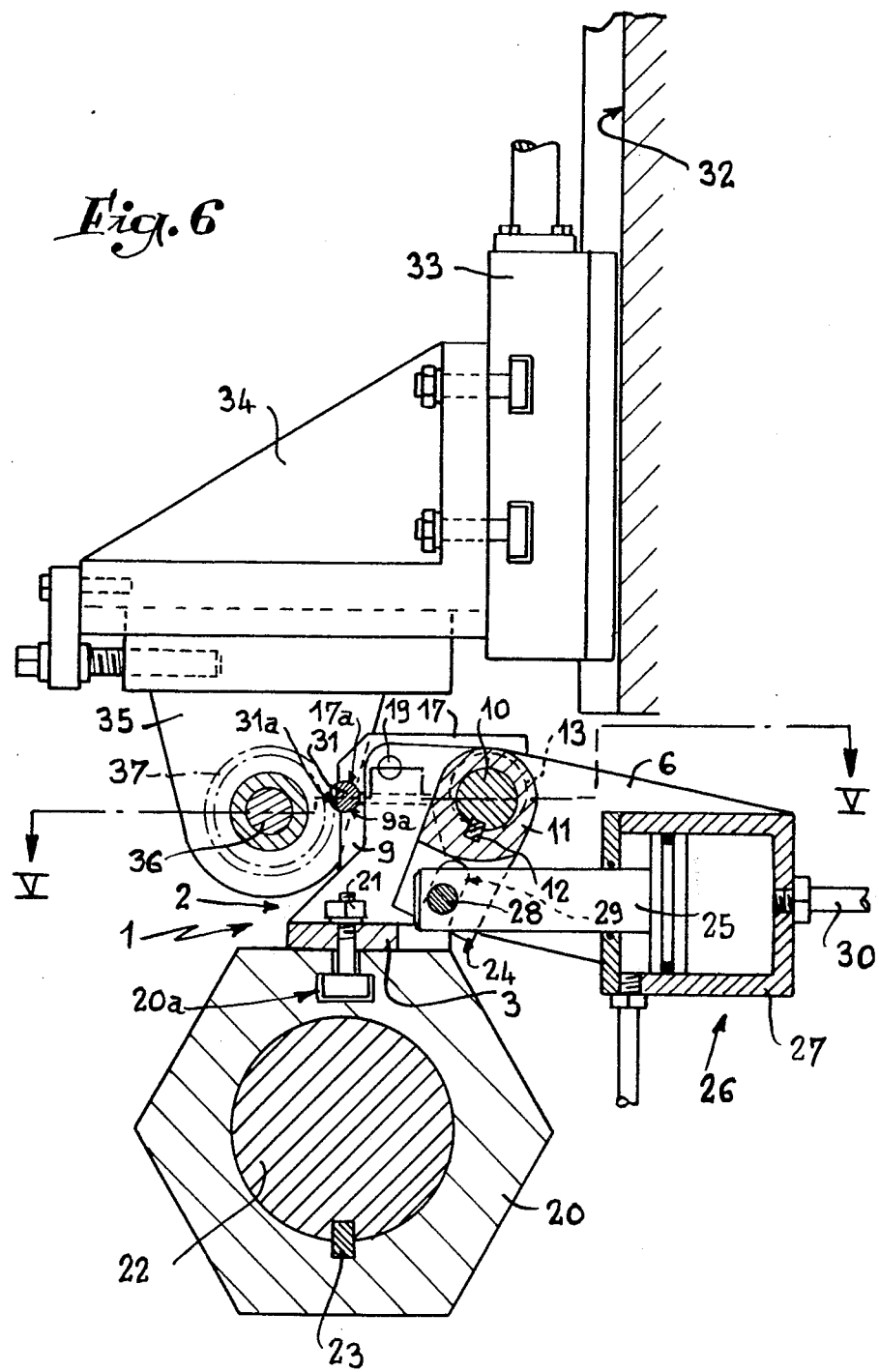

METHOD AND APPARATUS FOR CLAMPING AND MILLING WORK IN A LATHE

FIELD OF INVENTION

The present invention teaches improvements relating to automatic lathes, and relating more particularly to providing apparatus adapted to achieve the transverse milling of work pieces being manufactured on lathe machine tools of the type having multiple spindles, especially where the work pieces are of great length.

BACKGROUND OF INVENTION

At the present time, in order to achieve milling of the type mentioned above, it is necessary to go through repeated handling operations for each one of the work pieces after the lathe cutting operations have been performed. It involves a considerable waste of time to perform the different manipulations made necessary by such repeated handling of the work pieces in moving them between the automatic lathe and the milling machine. Of course, such waste of time involves a substantial increase in the cost of production of such pieces.

OBJECTS OF THE INVENTION

The improvements which form the object of the present invention seek to remedy the above shortcomings, and to permit the milling of work pieces diectly upon a multi-spindle automatic lathe on which the pieces are being cut. The procedure according to the present invention includes the steps of first approaching a head mounted on a movable central block carried by the lathe to the work piece until the jaws of a clamping device surround the piece and at the same time stopping its rotation, then actuating a movable jaw thereof for the purpose of clamping the piece, next moving a carriage which carries the milling tool to perform the desired milling operation, returning the aforesaid carriage to its initial position, releasing the clamped jaws, and finally actuating the return of the head and central block of the lathe to its initial position.

REFERRING NOW TO THE ACCOMPANYING DRAWINGS

FIG. 6 is a transverse sectional view similar to FIG. 2, but showing the clamping head and the milling carriage in their functioning positions.

Figure 1:
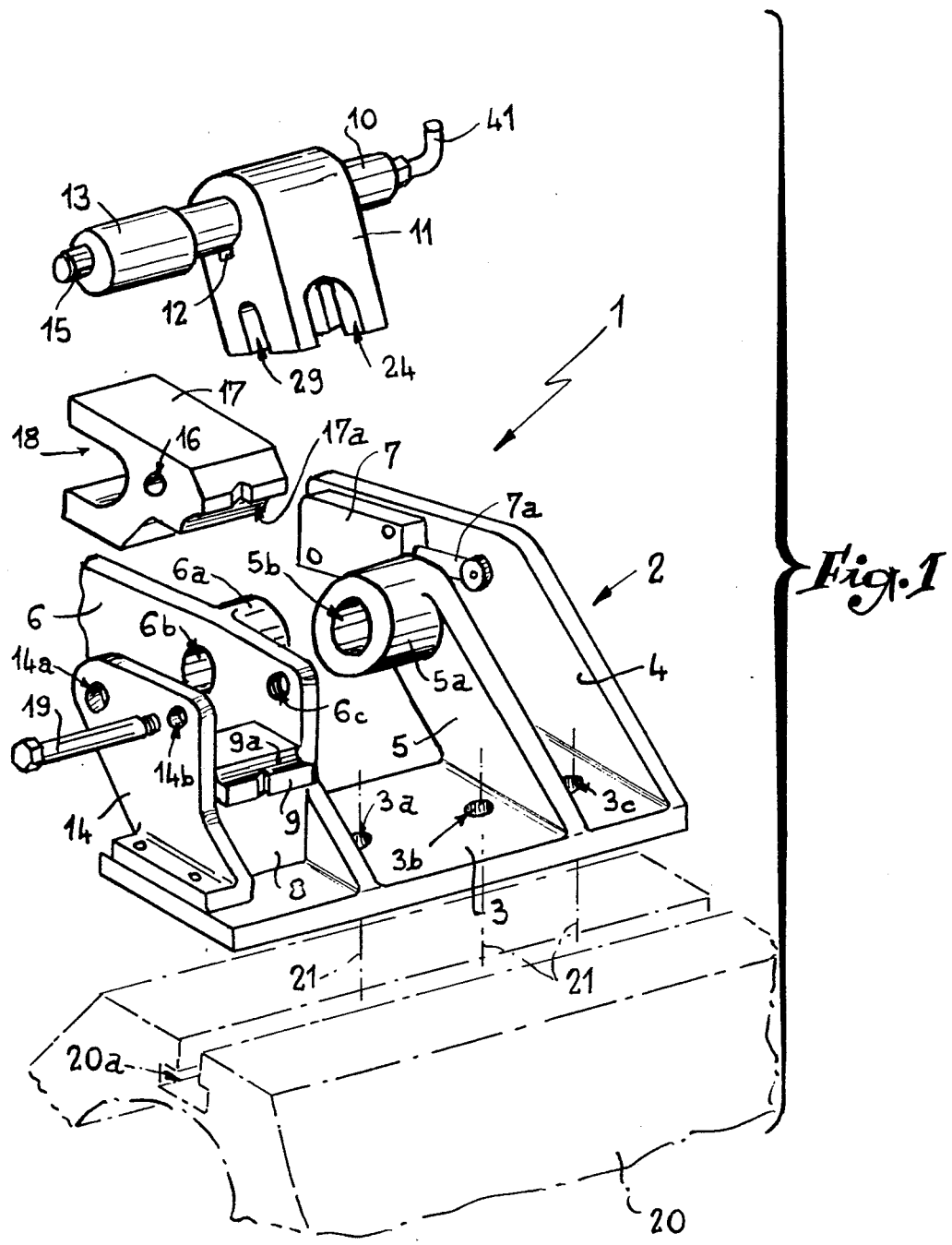
FIG. 1 is an exploded perspective view of a work piece gripping device and head according to the present invention.

Referring now to the drawings, the clamping device shown in FIG. 1 is generally designated by the reference character 1. It comprises a head 2 taking the form of a horizontal plate 3 from which there extends three flanges 4, 5, and 6 in the vertical direction. The latter two flanges 5 and 6 are each provided with a boss, respectively 5a and 6a, through which pass bores 5b and 6b. The flange 4 carries a microswitch 7 the purpose of which will be more fully explained hereinafter.

The plate 3 carries block 8 located against the flange 6 at the outer surface thereof. This block is fixed in any suitable manner to the plate 3, and it carries on its upper surface a fixed clamping jaw 9.

A shaft 10 is journaled in the bores 5b and 6b, which are mutually aligned, and carries a lever 11 which is placed between the bosses 5a and 6a so that the shaft 10 as above mentioned also passes centrally through it. The shaft is non-rotatively fixed to the lever 11 by a key 12. The portion of the shaft 10 which extends outwardly of the flange 6 carries an eccentric 13. Once the shaft 10 is in place, a fourth flange 14 is then attached to the plate 3, the flange 14 having an opening 14a extending therethrough and situated on the geometric axis which aligns with the bores 6b and 5b in such a manner that a journal 15 of a reduced diameter as compared with the shaft 10 can be engaged in the opening 14a. The flange 14 and the flange 6 are provided with two holes 14b and 6c which are mutually aligned, and which are aligned with the transverse opening 16 of a movable jaw 17 which is then placed between the two flanges 6 and 14. The movable jaw 17 is provided at its outer end with a fork 18 which extends around the eccentric 13 such that its opening 16 is aligned with the holes 6c and 14b in such a way that the jaw can pivot around a pin 19 engaged in that opening and in the holes above mentioned bearing the reference numerals 14b and 6c. The pin 19 has a threaded end which cooperates with the threaded hole 6c.

Figure 2:
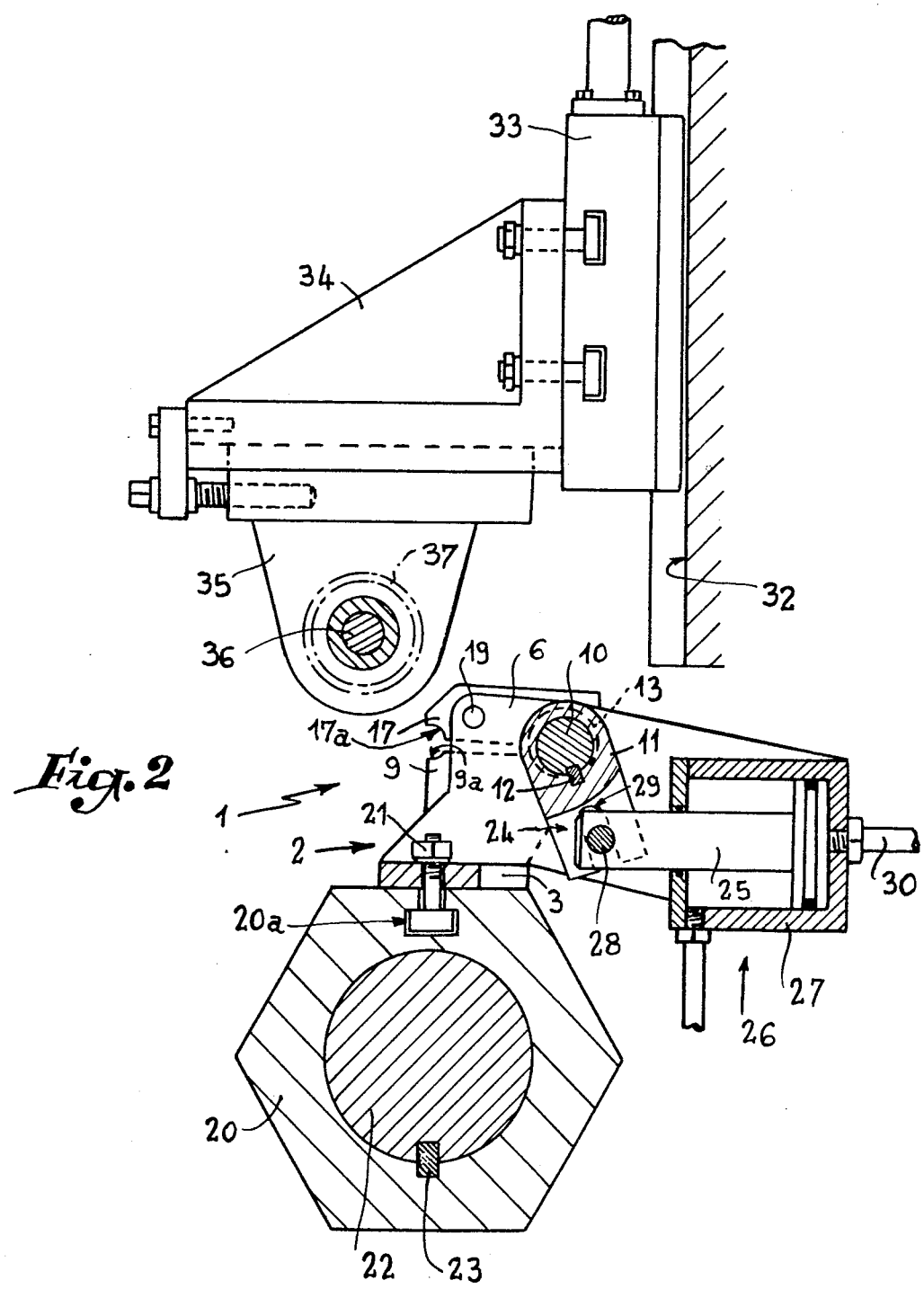
FIG. 2 is a transverse section through the apparatus showing the clamping head device and also showing the milling carriage according to the invention at their locations of rest.

The plate 3 is provided with holes 3a, 3b and 3c used to fix the head 2 to a central block 20 on the lathe by means of bolts (not shown) located on the center lines labelled 21, with the bolt heads placed in a longitudinal groove 20a of the block 20, FIG. 2. The block 20 is mounted in such a manner that it can be displaced axially in a predetermined angular position about a longitudinal shaft 22 which is fixed to the lathe in the center of the pattern of spindles and parallel thereto, the angular position of the block 20 with respect to the shaft 22 being maintained by means of a key 23 driven into a keyway in the shaft and disposed to slidably occupy in the manner known per se a keyway comprising a longitudinal groove in the block 20, whereby the block 20 is in sliding engagement with the shaft 22.

The lever 11 includes a transverse passage 24 through which extends a piston rod 25 of a fluid ram 26 including also a cylinder 27. The free end of the piston rod 25 is provided with a transverse pin 28 engaged in two slots 29 in the two branches of the fork 18 bifurcating around the passage 24, and which open as does the slot at the extreme free end of the lever 11.

Figure 3:
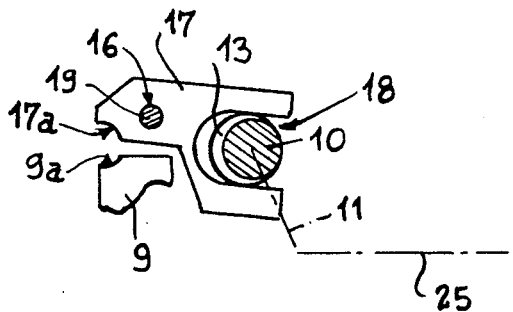

When the piston rod 25 is in the position shown in FIG. 2 within the cylinder 27, the eccentric is angularly oriented in such fashion that it rests on the lower face of the fork 18, whereby the movable jaw 17 as shown in FIG. 3 is most separated from the fixed jaw 9.

Figure 4:
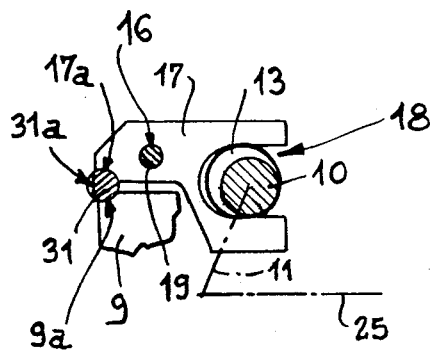
FIGS. 3 and 4 are partial views showing the operation of the jaws of the clamping device.

Conversely, if one introduces into the ram 26 fluid under pressure by way of the inlet 30 so that the fluid pressurizes the inner end of the cylinder 27 beeneath the head of the piston, the piston rod 25 and pin 28 are thereby displaced to the left as shown in FIG. 2, thereby causing rotation of the lever 11. As shown in FIG. 4, the eccentric 13 is thereby displaced in such a direction as to move the upper branch of the fork 18 of the movable jaw 17 upwardly, so that the outer end of the movable jaw approaches the fixed jaw 9, thereby clamping the work piece 31. Of course, the gripping surfaces 9a and 17a which are formed in the jaws are, as viewed horizontally, slightly greater in depth than the radius of the work piece, whereby the work piece will be maintained between them. It should be noted that as shown in FIG. 2, the cylinder 27 of the ram 26 is mounted on the flange 6.

Figure 5:
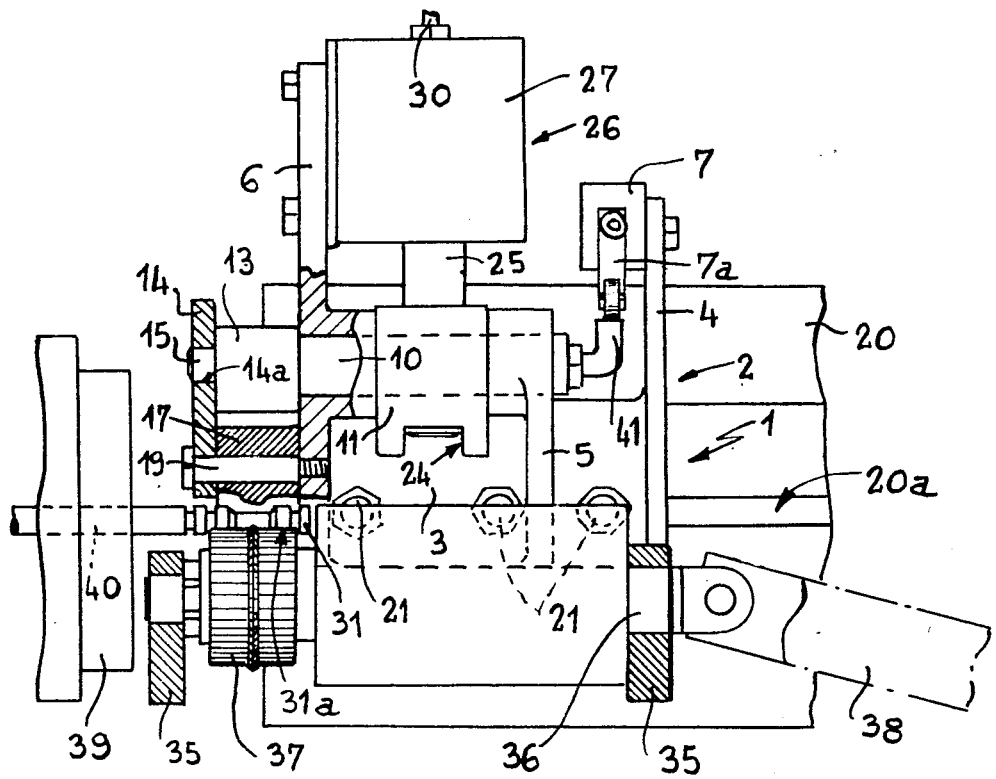
FIG. 5 is a horizontal view taken along line V — V of FIG. 6 and showing the apparatus according to the present invention.

A carriage 33 is supported on a slide 32 in the frame of the automatic lathe so that it can be displaced in either direction, the carriage having a support 34 carrying a bearing block 35 in which a spindle 36 is mounted for rotation, the spindle carrying offset at one end a milling cutter 37. The spindle 36 is driven by a telescopic shaft through suitable universal joints as shown in FIG. 5. The slide 32 is oriented perpendicular to the working face of the head 2 carrying the clamping device which is supported on the central block 20, the latter having six faces as shown in FIG. 2.

The operation of the apparatus follows the preceding description of the structure.

When one of the spindles, due to indexing of the automatic lathe, arrives at a position corresponding with the location of the clamping device 1 on the central block 20, the chuck 39 which is carried on the spindle stops rotating. The chuck supports the workpiece bar 40 at the outer end of which the shaped piece 31 has been cut in the bar during a previous operation. When the check 39 has stopped, the block 20 is displaced along the shaft 22 toward the shaped end 31 of the bar by any suitable means, and in such a way that the head 2 is brought to the shaped end 31 of the said bar and the jaws 9 and 17 surround the work piece bar.

Fluid under pressure is then introduced through the inlet tube 30 to pressurize the ram 26 and cause the jaws of the gripping device to tighten their grip in a manner functionally illustrated in FIG. 4. Then the carriage 33 is displaced downwardly along the slide 32 in such a manner that the milling cutter 37 cuts a flat 31a along the shaped piece 31, FIG. 6. When its cut is ended, the carriage 33 is returned to its initial position, the ram 26 is retracted by entry of fluid pressure on the opposite side of the piston until it has returned again to the position shown in FIG. 2, thereby disengaging the movable jaw 17. The block 20 also returns to its original position.

The main spindle 39 of the lathe is then put into rotation again such that the shaped piece 31 again begins turning. Then the turret of the lathe indexes to the next position by rotating one sixth of a turn for the purpose of bringing the same work piece to a cut-off position. As is shown in FIGS. 1 and 5, the shaft 10 is provided at its end opposite that which supports the bearing 15 with a bent finger 41 serving to actuate the lever 7a to close the microswitch 7 when the movable jaw 17 is in clamped position. The microswitch 7 is inserted in an electric circuit which is operative to control the sliding descent of the carriage 33. In the event that the ram 26 does not operate, or alternatively stated in case the movable jaw 17 does not grip the work piece 31, the milling operation will be prevented because the switch will remain open.

It should also be noted that the preceding description is only intended to provide a working example, and not to limit the scope of the invention, with respect to which it is possible to substitute other operating means recognized as being equivalent. In particular, although the present invention is illustrated in terms of milling apparatus according to the invention mounted on a multi-spindle lathe having six indexing positions, such apparatus could be applied to various other types of automatic lathes.

I claim:

1. The method of transversely milling a work piece in one of the index positions of an automatic multi-spindle lathe, including the steps of: advancing a head having work-clamping jaws toward the work piece located in said one index position until the jaws surround the work piece, stopping rotation of the work piece, clamping the work piece in the jaws, then advancing a carriage carrying a milling tool to the work piece and milling the work piece, returning the carriage to its rest position, releasing the jaws, and returning the head to its rest position, and advancing the lathe to its next index position.

2. Milling apparatus for use in combination with a multi-spindle turret lathe of the type supporting work pieces in the multiple-spindle positions and including means to sequentially index the spindle positions of the lathe about a central axis extending parallel to the spindles, comprising:
   a. a head movable along said central axis from a rest position to a position opposite the work piece in one selected index position, and the head including a work piece clamping device;
   b. a carriage including milling cutter means mounted on the lathe and movable transversely of said central axis from a rest position to a milling position wherein the milling cutter engages the work piece then occupying said selected index position; and
   c. control means operative in response to operation of the clamping device to enable the advance of the milling cutter carriage to said milling position.

3. Milling apparatus as set forth in claim 2, wherein the clamping device of said head comprises a first jaw fixed to the head and a second jaw movably mounted on the head in operative relationship to said fixed jaw; and actuating means on the head for selectively moving the second jaw to approach the fixed jaw and to retract therefrom.

4. Milling apparatus as set forth in claim 3, wherein said second jaw actuating means comprises eccentric means operatively connected to move said second jaw, and a fluid pressure ram having piston means coupled to operate said eccentric means.

5. Milling apparatus as set forth in claim 4, wherein said carriage includes slide means mounting it on the lathe, the slide means being perpendicularly oriented with respect to said central axis on which said clamping head is mounted, and said milling cutter means comprising a driven rotary milling cutter tool supported in a bearing mounted on the carriage.

* * * * *